United States Patent

[11] 3,623,581

[72] Inventor William G. Livezey
719 East Kessler Blvd., Indianapolis, Ind. 46220
[21] Appl. No. 71,697
[22] Filed Sept. 14, 1970
[45] Patented Nov. 30, 1971

[54] OVERRUNNING DEVICE
9 Claims, 7 Drawing Figs.
[52] U.S. Cl. .................................................. 192/45, 192/113 R
[51] Int. Cl. ...................................................... F16d 41/07
[50] Field of Search ............................................ 192/45, 113 R; 188/82.84

[56] References Cited
UNITED STATES PATENTS

| | | | |
|---|---|---|---|
| 2,029,244 | 1/1936 | Linder........................... | 192/45 |
| 2,247,713 | 7/1941 | Peterson et al. ............... | 192/45 |
| 2,061,167 | 11/1936 | Nardone....................... | 192/45 |

Primary Examiner—Allan D. Herrmann

ABSTRACT: Herein disclosed is a cam and roller-type of overrunning device which may be used as either a clutch or brake. The device includes a full compliment of interspersed long and short rollers and a cam whose cam faces each have a composite contour for camming the rollers which are normally biased toward engagement by tickle springs operating on the long rollers. The composite contour has a constant or decreasing angle of attack for overrun and an increasing angle of attack for engagement with backstops being provided for limiting travel of the rollers on overrun.

INVENTOR
William G. Livezey

INVENTOR.
William G. Livezey

INVENTOR.
William G. Livezey

INVENTOR.
William G. Livezey

OVERRUNNING DEVICE

This invention relates to an overrunning device and more particularly to an overrunning device having interspersed long and short rollers with tickle springs and a composite cam face contour.

As is well known in this art, the present day overrunning devices used in the drive lines and transmission system of many types of machines including automobile vehicles, earthmoving equipment and the like, suffer from several problems. For example, present overrunning devices which may be used to provide either clutch or brake operation generally have rollers of equal length which generally prohibits the use of tickle springs and cages because of space limitations. Furthermore, the only backstops for the rollers in such devices are the toes of the adjacent cam faces and as a result the rollers sometimes become cramped during overrun causing damage to both the cam and the rollers. When cages are used to control the position of the rollers, the space occupied by the bars of the cage does not permit the use of the desired full complement of rollers and generally the cages are fragile. Furthermore, present day overrunning devices generally have a cam whose cam faces each have a single geometric form over its entire length and while one form of contour will be advantageous for engagement it is generally disadvantageous during overrun and vice versa.

The overrunning device according to the present invention has a full complement of interspersed long and short rollers that operate between a cylindrical raceway and a cam whose faces each have a composite contour. By the employment of long and short rollers there is permitted the use of tickle springs which are arranged to bias the long rollers near their outboard ends to hold the rollers out for engagement with the cylindrical surface. The long rollers are engageable near their outboard ends with backstops which insure that the rollers will not cramp on the toes of the adjacent cam faces during overrun. Another feature of the overrunning device according to the present invention is the provision of the composite cam contour for each cam face. The composite contour provides either a constant or decreasing angle of attack in the area of the associated roller during overrun and an increasing angle of attack from the incipient engagement point through the engaging area. As a result, stress minimized during engagement while good releasing characteristics are maintained and, furthermore, radial clearance for the rollers during overrun is maximized.

An object of the present invention is to provide a new and improved cam and roller type overrunning device.

Another object is to provide a cam and roller type of overrunning device having interspersed long and short rollers with tickle springs and backstops operating on the long rollers.

Another object is to provide in a cam and roller type of overrunning device a cam face having a composite contour effecting an optimum angle of attack for overrun and also an optimum angle of attack for engagement.

These and other objects of the present invention will become more apparent from the following detailed description and drawings in which.

Figure 1:
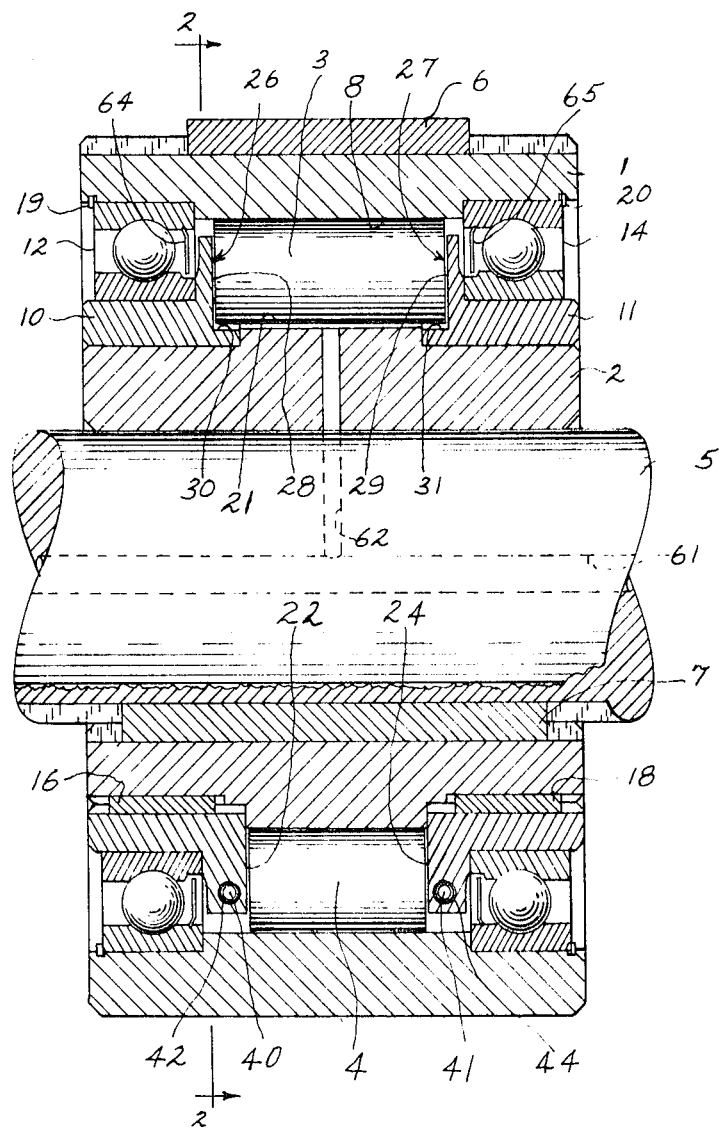
FIG. 1 is a longitudinal sectional view of an overrunning device according to the present invention.
Figure 2:
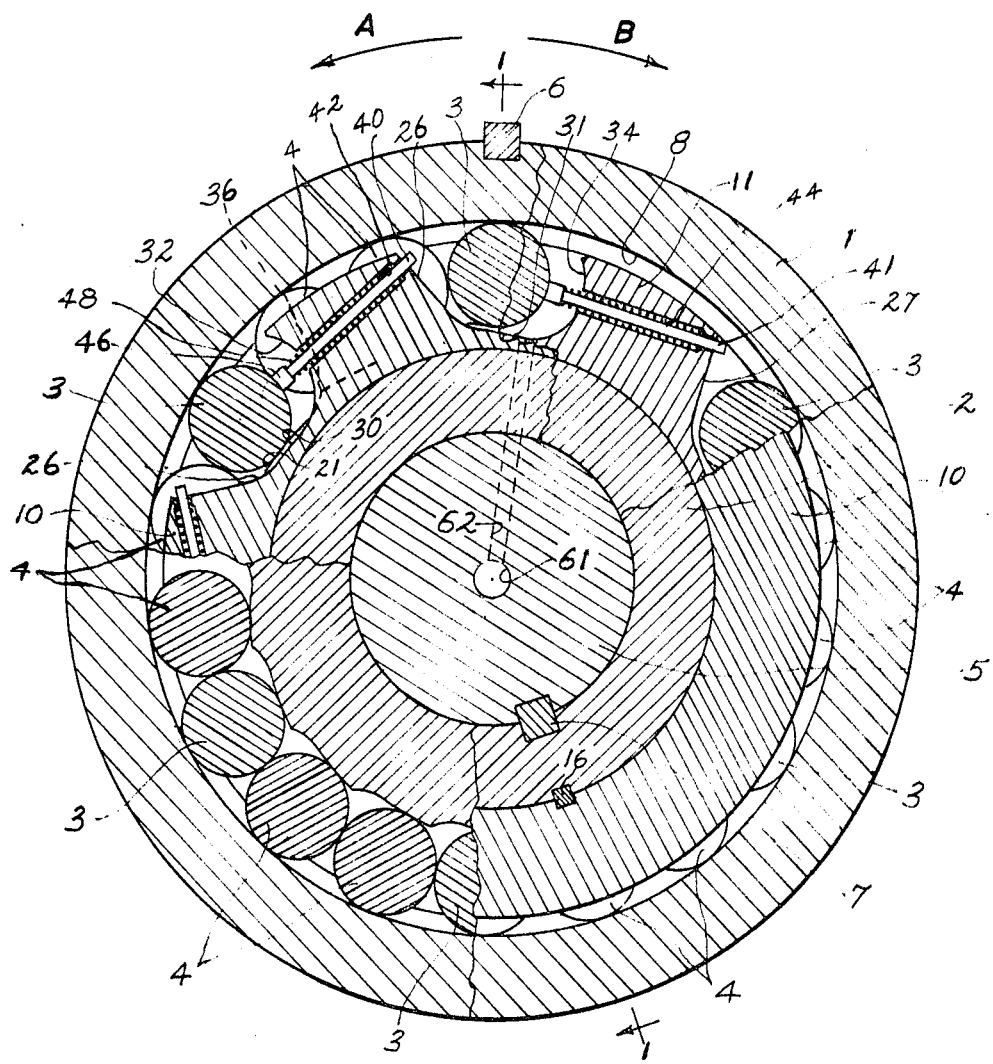
FIG. 2 is a view taken on line 2—2 in FIG. 1 with certain parts broken away.

Referring to FIGS. 1 and 2 the overrunning device according to the present invention which may also be called a oneway device and may be used as either a clutch or brake generally comprises an outer race member 1, an inner cam member 2 and a plurality of cylindrical rollers of equal diameter of which rollers 3 of one axial length are interspersed with rollers 4 of a shorter axial length. The overrunning device may be used as either a clutch or brake in the drive lines and transmission systems of automobile vehicles, earthmoving equipment and the like. In the case of usage as a clutch, the race member 1 may be the driving member and the cam member 2 the driven member that is connected to drive a shaft 5 as shown or vice versa. In the case of brake usage, the race member 1 may be stationary and the cam member 2 connected to transmit reaction or vice versa. The overrunning device is adapted to be connected in such systems by keys 6 and 7 provided on members 1 and 2, respectively; the key 7 in this case connecting member 2 to shaft 5.

The race member 1 which has a cylindrical shape has an inner cylindrical surface or raceway 8 that makes frictional engagement with the interspersed long and short rollers 3 and 4. The race member 1 is mounted concentric with the cam member 2 by means of axially spaced annular side members 10 and 11 and antifriction bearings 12 and 14 of the ball type so that except for the camming action as described in more detail later, there is provided free relative rotation between race member 1 and cam member 2. The side members 10 and 11 are fixed at their inner radius to cam member 2 by keys 16 and 18, respectively, and the bearings 12 and 14 are fitted between the side members 10 and 11, respectively, and the race member 1 where they are retained by retaining rings 19 and 20, respectively.

The cam member 2 has a raised cam contour between side members 10 and 11 comprising a plurality of identical cam faces 21, one for each of the rollers 3 and 4, to provide for forcing the rollers radially outward by camming action against the raceway 8 to effect connection of members 1 and 2. The side members 10 and 11 axially locate the rollers as shown in FIG. 1 by the provision of opposed radially extending faces 22 and 24 that are closely adjacent to and face the opposite ends of short rollers 4. Axially aligned pockets 26 and 27 in the respective faces 22 and 24 are provided for each long roller 3 whose ends project into these pockets and are closely adjacent to the radially extending sides 28 and 29 of the respective pockets as shown in FIG. 1. The radially inner faces 30 and 31 of the respective pockets 26 and 27 are below the cam faces 21 to clear the projecting end portions of long rollers 3 which are engageable with arcuate, radially extending surfaces 32 and 34 of the respective pockets 26 and 27 as shown in FIGS. 1 and 2. The surfaces 32 and 34 are located relative to cam faces 21 to provide circumferentially arranged, axially aligned pairs of backstops that are contactable with the projecting end portions of long rollers 3 to prevent these rollers and thus also the short rollers 4 from contacting toes 36 of the cam faces 21.

The overrunning device disclosed has a total of 18 rollers, six of which are equally spaced long rollers 3 and the remaining intermediate rollers are the short rollers 4 and it will be understood by those skilled in this art that any desired number of rollers may be used and that the number of intermediate short rollers may be varied. Since the device does have a full complement of rollers with a small circumferential clearance between the rollers, each long roller 3 maintains the two short rollers 4 ahead of it in substantially the same position with respect to their cam faces 21 without the use of a cage. Each of the cam faces 21 has a composite contour as described in more detail later but at this point it will be sufficient to know only that when race member 1 turns in the direction indicated by arrow A in FIG. 2 relative to cam member 2, camming action is provided to connect these members. Alternatively, the cam faces 21 release the rollers 3 and 4 from wedging engagement with the raceway 8 when race member 1 turns in the opposite direction as indicated by arrow B in FIG. 2 relative to cam member 2 in which event free relative rotation or overrun occurs.

Tickle force means for yieldably holding the rollers outward for engagement with raceway 8 is provided by plungers 40 and 41 that are mounted on the side members 10 and 11, respectively, there being provided a pair of plungers for each long roller 3. The plungers 40 and 41 are located in holes 42 and 44 that extend through backstop faces 32 and 34 respectively, the axes of these holes being chordally arranged about the axis of the device. Each of the plungers has a head 46 as shown in FIG. 2 which is sized to be received and guided in the accommodating hole in which is mounted a spring 48 that is bottomed at its right-hand end on a step in the hole and its left-hand end engages the plunger head 46 to urge the plunger against the projecting end portion of the long roller 3. With the full complement of rollers, the two tickle forces acting on the end portions of each of the long rollers 3 maintain the two short rollers 4 ahead of the long roller in substantially the same position with respect to their cam faces. Thus, all of the rollers 3 and 4 are held outward for engagement with the race member.

Figure 3:
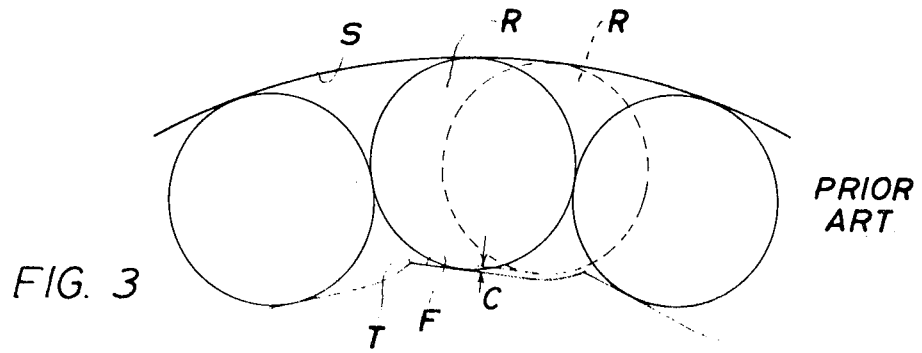
FIGS. 3, 4 and 5 illustrate certain prior art overrunning devices.
Figure 4:
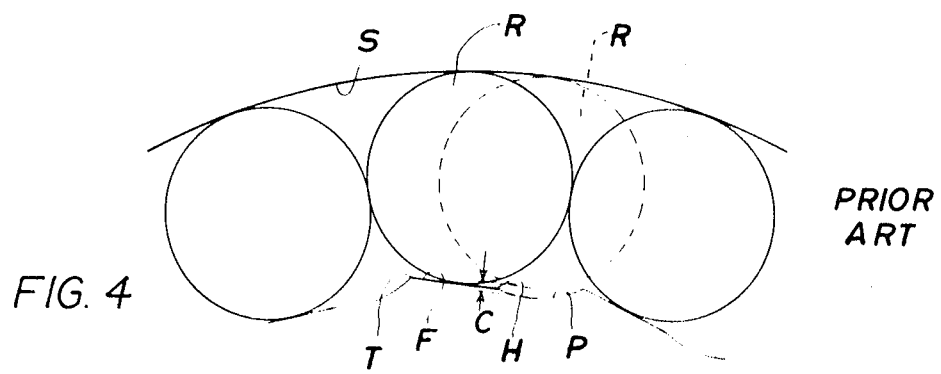
Figure 5:
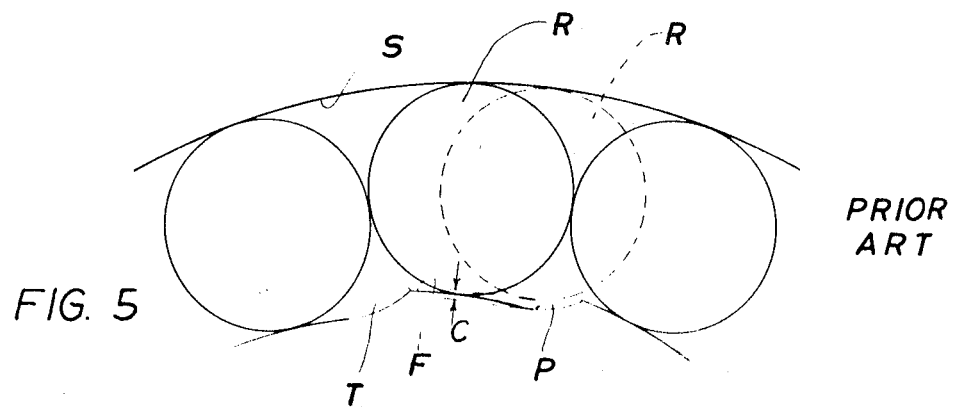

The cam faces according to the present invention may be best understood by a clear understanding of prior cam face contours and for that purpose reference is made to FIGS. 3, 4 and 5 which illustrate three different kinds of known cam contours. Referring to FIG. 3, one known overrunning device has the normal cylindrical surface S engaged by a plurality of equal length rollers R which in turn are engaged by cam faces F which are flat. The rollers shown in a solid line are in their engaged positions and the roller shown in dotted line illustrates the disengaged or overrunning position. With the flat type of cam face, the radial clearance C of the roller with the cam face is small in comparison with other types of cam faces as discussed in more detail later and because of unavoidable bearing clearances, eccentricities and dimensional tolerances in the mounting between the cam and race member, it is not uncommon for the cam faces to bounce against the rollers during overrun. As a result, a roller may cramp against the toe T of the cam face resulting in damage to both the roller and cam, there being no backstop to protect the toe of the cam when a full complement of rollers of equal length are used.

FIG. 4 illustrates another prior overrunning device in which the clearance C is enlarged in comparison with the device shown in FIG. 3 by the provision of a relief pocket P. However, such a pocket creates a heel point H with the flat cam face F thereby providing a high angle of attack with the rollers which may inhibit engagement.

FIG. 5 illustrates another prior overrunning device in which the cam face F, instead of being flat as in the case of the devices shown in FIGS. 3 and 4, are formed to a logarithmic spiral which curve makes a constant angle with the radius vector and presents a constant angle of attack to the rollers. This type of cam contour inherently provides a relief pocket P tangent to the cam face F which pocket has approximately twice the clearance C of the flat cam in FIG. 3 with no inhibitions for engagement.

Figure 6:
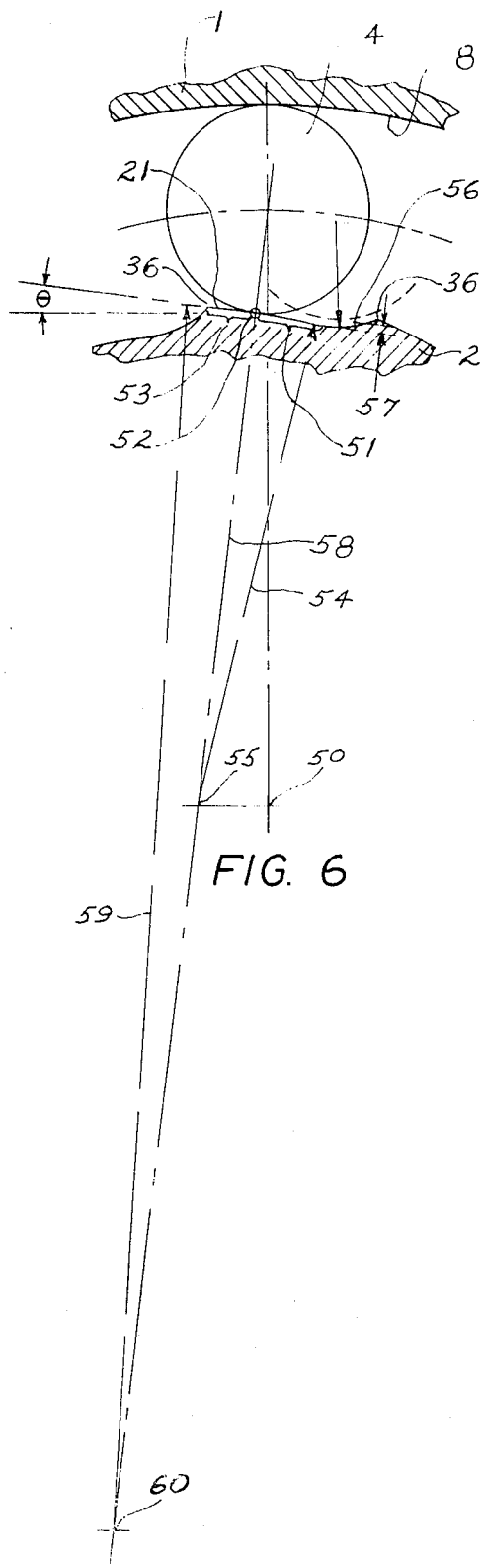
FIG. 6 is an enlarged partial transverse sectional view of one form of a cam face according to the present invention.
Figure 7:
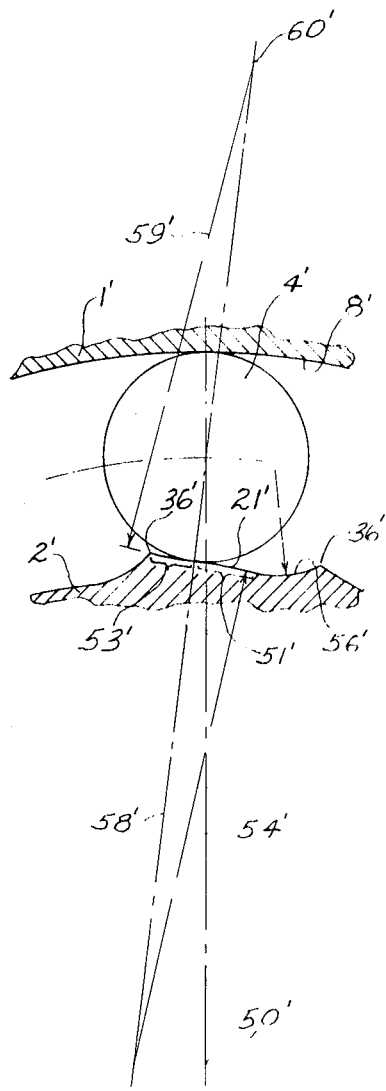
FIG. 7 is an enlarged partial transverse section view of another form of cam face contour according to the present invention.

The contour of the cam faces 21 according to the present invention is shown in two forms in FIGS. 6 and 7. In both FIGS. 6 and 7, the center or axis of the overrunning device designated as 50. Describing first the contour shown in FIG. 6, each of the cam faces 21 has three distinct parts, namely an approach or flank area 51, an incipient engagement or pitch point 52, and an engagement or face area 53. The approach area 51 is made to a constant angle form whose curvature has a radius 54 having a center 55. The approach area 51 is joined to the adjacent cam face by a fillet 56. The radius 54 is made sufficiently short enough to provide a clearance 57 that is larger than prior art devices of the type shown in FIG. 3, for example. The pitch point 52 is set to any desired angle $\theta$ for incipient engagement with the rollers, the center 55 falling approximately on a line 58 which is drawn perpendicular to a tangent through the pitch point and passes through this point. Thus the flank area 51 and face area 53 are approximately tangent to each other at the incipient engagement point 52. The face area 53 is made to a radius of curvature 59 which is larger than radius 54 and whose center 60 lies on line 58. Thus, it will be appreciated that the angle of engagement or attack of the face area 53 with the rollers may be increased by increasing the radius 59 until a flat surface is produced.

The angle of attack of the face area 53 may be made even greater than that shown in FIG. 6 by reversing the curvature of the face area as shown in FIG. 7 in which corresponding parts are designated by the same numbers but primed. Referring to FIG. 7, the increase in angle is made by reversing the curvature of the face area 53' so that now radius 59' has its center 60' falling on line 58' on the other side of the incipient engagement point 53', the face and approach areas being approximately tangent near the pitch point in both forms. In FIG. 7, the approach area 51' of each cam face is joined to the face of the adjacent cam by a fillet 56' like the cam face in FIG. 6. If because of abnormal tolerances in the assembled overrunning device the cam faces should still contact the rollers during overrun even with the large clearances the backstops will prevent the rollers from cramping on the toes 36 and 36' of the adjacent cams in both forms of the cam faces.

The overrunning device is lubricated as shown in FIGS. 1 and 2 by means of a supply passage 61 which extends axially through shaft 5 and is connected to a feed passage 62. Passage 62 extends radially outward through cam member 2 to discharge lubricant onto the rollers and raceway. Annular bearing shields 64 and 65 are provided on the inboard sides of the bearings 12 and 14 as shown in FIG. 1 to keep the raceway and outer portion of the rollers submerged in the lubricant to prevent scuffing of the race and rollers.

The above-described embodiment is illustrative of the invention which may be modified within the scope of the appended claims.

I claim:

1. In an overrunning device the combination of a cam member, a race member concentric with and rotatable rollers relative to said cam member, an endless continuous train of interspersed short rollers and long rollers whose ends project beyond the ends of said short rollers, all of said rollers being forcible against said race member by said cam member to prevent rotation of said race member relative to said cam member in only one direction whereby said race member is free to overrun said cam member in the opposite direction, biasing means engaging the projection end portions of said long rollers for biasing all said rollers toward engagement with said race member, and said cam member having a cam face for each of said rollers comprising an approach area and an engagement area which are tangent to each other at an incipient engagement point and wherein said engagement area has an increasing angle of attack with respect to the roller it engages to prevent the relative movement in said one direction and said approach area has a different angle of attack with respect to the engaged roller on relative rotation between said members in the opposite direction.

2. In an overrunning device the combination of a pair of concentrically arranged relatively rotatable members, one of said members having a cylindrical surface, the other of said members having a cam surface facing said cylindrical surface, an endless continuous train of interspersed short rollers and long rollers whose ends project beyond the ends of said short rollers, all of said rollers being forcible against said cylindrical surface by said cam surface to prevent rotation of said one member relative to said other member in only one direction whereby said one member is free to overrun said other member in the opposite direction and biasing means engaging the end portions of said long rollers for biasing all of said rollers toward engagement with said cylindrical surface.

3. The overrunning device set forth in claim 2 and backstop means fixed to said other member for abutting the projecting end portions of said long rollers to limit the travel of all of said rollers with respect to said other member during overrun.

4. The overrunning device set forth in claim 2 and said cam surface having a cam face for each of said rollers of composite contour providing an increasing angle of attack with respect to the roller it engages to prevent the relative rotation between said members.

5. The overrunning device set forth in claim 4 and said composite contour providing a decreasing angle of attack with respect to the roller it engages to provide sufficient clearance with the roller to freely permit overrun.

6. In overrunning device the combination of a pair of concentrically arranged relatively rotatable members, one of said members having a cylindrical surface, the other of said members having a cam surface, an endless continuous train of interspersed long and short rollers, all of said rollers being forcible against said cylindrical surface by said cam surface to prevent rotation of said one member relative to said other member in only one direction whereby said one member is free to overrun said other member in the opposite direction, and said cam surface comprising a composite cam face for each said roller comprising an approach area and an engagement area which are approximately tangent to each other at an incipient engagement point and wherein said engagement area has an increasing angle of attack with respect to the roller it engages to prevent the relative rotary movement in said one direction and said approach area has a different angle of attack with respect to the engaged roller on relative rotary movement of said members in the opposite direction.

7. The overrunning device set forth in claim 6 and lubricant retention means for retaining a liquid lubricant between said members to maintain said rollers substantially submerged in lubricant.

8. The overrunning device set forth in claim 6 and said approach area having a decreasing angle of attack with respect to the roller it engages to freely permit overrun of said one member relative to said other member, said approach area further having a fillet connecting said approach area to the engagement area of the adjacent cam face.

9. The overrunning device set forth in claim 8 and backstop means fixed to said other member for abutting the projecting end portions of said long rollers to prevent all of said rollers from contacting the junctures of said cam faces during overrun.

* * * * *